(12) United States Patent
Sato et al.

(10) Patent No.: US 8,003,019 B2
(45) Date of Patent: *Aug. 23, 2011

(54) SILVER PARTICLE DISPERSION INK

(75) Inventors: Kimitaka Sato, Honjo (JP); Kozo Ogi, Honjo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 12/522,418

(22) PCT Filed: Jan. 9, 2007

(86) PCT No.: PCT/JP2007/050376
§ 371 (c)(1),
(2), (4) Date: Jul. 8, 2009

(87) PCT Pub. No.: WO2008/084558
PCT Pub. Date: Jul. 17, 2008

(65) Prior Publication Data
US 2010/0038603 A1  Feb. 18, 2010

(51) Int. Cl.
*H01B 1/22* (2006.01)
(52) U.S. Cl. ......... 252/514; 428/402; 428/403; 428/407
(58) Field of Classification Search .................. 252/514; 428/402, 403, 407
See application file for complete search history.

(56) References Cited

U.S. PATENT DOCUMENTS

| | | | |
|---|---|---|---|
| 7,491,257 B2 * | 2/2009 | Sato | 75/255 |
| 7,776,442 B2 * | 8/2010 | Sato | 428/402 |
| 2005/0257643 A1 * | 11/2005 | Ogi et al. | 75/255 |
| 2005/0279970 A1 * | 12/2005 | Ogi et al. | 252/514 |
| 2006/0107791 A1 * | 5/2006 | Fujino et al. | 75/365 |
| 2006/0199008 A1 * | 9/2006 | Sato | 428/402 |
| 2008/0146680 A1 * | 6/2008 | Sato | 516/31 |
| 2009/0236567 A1 * | 9/2009 | Ogi et al. | 252/514 |
| 2010/0006002 A1 * | 1/2010 | Sato et al. | 106/31.13 |
| 2010/0025639 A1 * | 2/2010 | Ogi et al. | 252/514 |

FOREIGN PATENT DOCUMENTS

WO  WO 2006082987 A1 *  8/2006
WO  WO 2006082996 A1 *  8/2006

* cited by examiner

*Primary Examiner* — Douglas McGinty
(74) *Attorney, Agent, or Firm* — Clark & Brody

(57) ABSTRACT

A silver particle dispersion liquid comprising a silver particle powder having an average particle diameter ($D_{TEM}$) of 50 nm or less, the surface of the particle being covered with an organic protective material, dispersed in a non-polar or small polar liquid organic medium having a boiling point of 60 to 300° C., wherein the organic protective material is an amine compound having one or more unsaturated bonds in one molecule. The silver particle dispersion liquid can be produced by reducing a silver compound in a liquid including one or more alcohol or polyol acting as a reducing agent, wherein the reduction reaction is conducted in the presence of an amine compound having a molecular weight of 100 to 1,000 and having one or more unsaturated bonds in one molecule.

5 Claims, No Drawings

SILVER PARTICLE DISPERSION INK

TECHNICAL FIELD

The present invention relates to a silver particle dispersion liquid comprising a silver particle powder having a particle diameter of nanometer order, dispersed in a liquid medium of an organic compound (hereinafter referred to as a "liquid organic medium"), and a process for producing the same. More particularly, it relates to a silver particle dispersion liquid suitable as a material for interconnection (in other word, wiring) formation for forming fine circuit patterns, for example, a material for interconnection formation by an inkjet method, and a process for producing the same. The silver particle dispersion liquid of the present invention is suitable as a material for forming interconnection of LSI substrates and FPD (flat panel display), and furthermore, a material for interconnection formation, such as embedding of fine trench, via hole and contact hole, and can be applied as a coloring material in automobile coating.

PRIOR ART

When a solid substance has a dimension of nm order (nanometer order), its specific surface area is greatly increased. As a result, its interface with a gas and a liquid is extremely increased although being a solid. For this reason, the properties of the surface greatly affect the properties of a solid substance. In the case of a metal particle powder, it is known that the melting point is drastically decreased as compared with the case in a bulk state. For this reason, drawing of fine interconnection becomes possible as compared with using a material having particles of μm order, and the metal particle powder becomes to fulfill the advantage that it can be sintered at low temperature. Of metal particle powders, a silver particle powder has low resistance and high weather resistance, and the metal is inexpensive as compared with other noble metals. In view of those, the silver particle powder is particularly expected as a next-generation interconnection material forming for narrow line.

Roughly speaking, a gas phase process and a liquid phase process are known as the processes for producing a silver particle powder of nm order. The gas phase process is generally an evaporation method in gas, and Patent Document 1 describes a process of evaporating silver in an inert gas atmosphere such as helium and under low pressure of about 0.5 Torr. Regarding the liquid phase process, Patent Document 2 discloses a process for obtaining colloid of silver by reducing silver ions with amine in water phase, and moving the obtained fine silver particles to an organic solvent phase containing a high molecular weight dispersant. Patent Document 3 describes a process for reducing silver halide in a solvent using a reducing agent (alkali metal borate hydride or ammonium borate hydride) in the presence of a thiol type protecting agent.

Patent Document 1 : JP-A 2001-35255
Patent Document 2: JP-A 11-319538
Patent Document 3: JP-A 2003-253311

PROBLEMS THAT THE INVENTION IS TO SOLVE

Silver particles obtained by the gas phase process of Patent Document 1 have a particle diameter of 10 nm or less, and have good dispersibility in liquid. However, this production process requires a special apparatus. For this reason, it is difficult to industrially synthesize a large amount of silver nanoparticles, and in addition to this, the yield of silver particles is low, which make the particle powder obtained by this production expensive.

Contrary to this, the liquid phase process is basically suitable for quantity synthesis, but has the problem that the nanoparticles have extremely high aggregating property in a liquid, and due to this property, it is difficult to obtain a dispersion liquid of nanoparticles dispersed in the form of single particle. Generally, citric acid is often used as a dispersion medium in the production of nanoparticles, and it is general that a metal ion concentration in a liquid is extremely low as 10 mmol/liter (=0.01 mol/liter) or less. This was a major bottleneck in industrial application.

Patent Document 2 discloses to synthesize silver nanoparticles stably dispersed with high metal ion concentration of 0.2 to 0.6 mol/liter and high raw material charging concentration by a liquid phase process. However, an organic dispersant of a high molecular weight whose number average molecular weight is several tens of thousands is used to suppress the aggregation. In the silver nanoparticle using a high molecular weight organic dispersant, there is no problem in the case that it is used as a coloring material. However, in the case that the silver nanoparticle is used for circuit formation, the high molecular weight organic dispersant is difficult to burn and is therefore liable to remain at the time of calcination, and furthermore, pores are liable to be generated in interconnection even after calcination, resulting in increasing resistance and causing disconnection. Thus, there is a problem in forming fine interconnection by low temperature calcination. Furthermore, use of the high molecular weight organic dispersant gives rise to the problem that viscosity of the silver particle dispersion liquid is increased.

Patent Document 3 describes that reaction is conducted with relatively high charging concentration of 0.1 mol/liter or more in a liquid phase process, and silver particles of 10 nm or less obtained are dispersed in an organic dispersant. In Patent Document 3, a thiol type dispersant is proposed as a dispersant. The thiol type dispersant has low molecular weight of about 200, and therefore can easily be removed by low temperature calcination at the time of interconnection formation. However, the thiol type dispersant contains sulfur (S). The sulfur content is the cause to corrode interconnection and other electronic parts, and is therefore not preferred for use in interconnection formation.

Accordingly, the present invention has an object to solve those problems and to obtain a dispersion liquid of high dispersible silver particles, suitable for use in fine interconnection formation and having good low temperature calcination property, inexpensiveness, in large amount at high yield.

MEANS FOR SOLVING THE PROBLEMS

According to the present invention which was made to solve the problems, there is provided a silver particle dispersion liquid comprising a silver particle powder having an average particle diameter ($D_{TEM}$) of 50 nm or less, the surface of the particle being covered with an organic protective material, dispersed in a non-polar or small polar liquid organic medium having a boiling point of 60 to 300° C., wherein the organic protective material is an amine compound having one or more unsaturated bond in one molecule. The amine compound used has a molecular weight of 100 to 1,000. The silver particle in the dispersion liquid preferably has a crystal particle diameter (Dx) of 50 nm or less and a monocrystallinity ($D_{TEM}$/Dx) of 2.0 or less. The dispersion liquid has a silver concentration of 5 to 90 wt %, a viscosity of 50 mPa·s or less which indicates the liquid is a Newtonian liquid, a surface tension of 80 mN/m or less, and pH of 6.5 or more. The dispersion liquid passes through a membrane filter having a pore diameter of (average particle diameter ($D_{TEM}$) of silver particle powder+20 nm). The silver particle dispersion liquid according to the present invention does not contain a high molecular weight binder and the like, has an ignition loss (weight loss at 300° C. heat treatment—weight loss at 1,000° C. heat treatment) of less than 5%, and has good sinterability at low temperature. Therefore, the silver particle dispersion is suitable for interconnection formation by an inkjet method and thin film formation by coating.

The silver particle powder used in the silver particle dispersion liquid according to the present invention can be produced by a liquid phase process in which a silver compound is reduced with a liquid organic medium. In this case, one or more of alcohol or polyol, having a boiling point of 80° C. or higher acting as a reducing agent is used as the liquid organic medium, and the reduction reaction is conducted in the presence of an organic compound (one or more amine compound). The silver particle powder thus obtained is dispersed in a non-polar or small polar dispersion medium, and coarse particles are separated from the dispersion medium. Thus, the silver particle dispersion liquid according to the present invention can be obtained.

That is, according to the present invention, there is provided a process for producing a silver particle dispersion liquid, comprising reducing a silver compound in a liquid comprising one or more alcohol or polyol acting as a reducing agent, wherein the reduction reaction is conducted in the presence of an amine compound having a molecular weight of 100 to 1,000 having one or more unsaturated bond in one molecule, and obtained silver particle powder is dispersed in a non-polar or small polar liquid organic medium having a boiling point of 60 to 300° C.

PREFERRED EMBODIMENT OF THE INVENTION

As a result of various investigations to produce a silver particle powder by a liquid phase process, one of the present inventors found that when silver nitride is subjected to reduction treatment in an alcohol having a boiling point of 85 to 150° C. at a temperature of 85 to 150° C. (while refluxing evaporated alcohol to liquid phase) in the presence of, for example, an amine compound having a molecular weight of 100 to 400, spherical silver nanoparticle powder having uniform particle diameter is obtained, and described it in the specification and drawings of Japanese Patent Application No. 2005-26805. Furthermore, the present inventor found that when a silver compound (representatively, silver carbonate or silver oxide) is subjected to reduction treatment in an alcohol or a polyol, having a boiling point of 80° C. or higher at a temperature of 85° C. or higher in the presence of, for example, a fatty acid having a molecular weight of 100 to 400, spherical silver particle powder containing a fewer amount of corrosive compounds and having uniform particle diameter is obtained, and described it in the specification and drawings of Japanese Patent Application No. 2005-26866. In either case, a silver particle dispersion liquid can be obtained by dispersing the silver particle powder in a non-polar or small polar liquid organic medium, and by separating coarse particles from the dispersion liquid in a centrifugal separator or the likes, a dispersion liquid can be obtained, in which silver particles having less scattering of particle diameter are mono-dispersed such as having a CV value of less than 40%, wherein the CV value is represented by an equation of 100× (standard deviation σ)/(average number of particles).

In those processes, when the reaction temperature is increased, silver ions in the liquid are efficiently reduced, but sintering of particles occurs to form coarse particles, and it is difficult to obtain the intended silver particle powder of 50 nm or less. On the other hand, where the reaction temperature is decreased, sintering can be suppressed, but reduction efficiency of silver ions in a liquid is decreased, resulting in decrease of yield. As a result, further improvement was required to produce the intended silver particle powder of 50 nm or less with good efficiency.

Regarding the problem, it was found that when a compound having a molecular weight of 500 or more is used as the organic compound, sintering can be suppressed even though the reaction temperature is increased, and as a result, a silver particle powder of 50 nm or less can be obtained with high rate of reduction in high efficiency. However, it was seen that another problem arises that when an organic compound having a large molecular weight is used, in the case that the silver particle dispersion liquid is used as a material for interconnection formation, sinterability at low temperature of 300° C. or lower is markedly decreased.

Form these facts, when a high molecular weight organic compound is used, obtaining a silver particle powder of 50 nm or less in high yield and low temperature sinterability of the silver particle dispersion liquid cannot be achieved together.

Furthermore, in circuits using an organic film or the like as a substrate, those cannot substantially be calcined at a temperature of 300° C. or higher. This poses limitation in applications of the dispersion liquid. Even in circuit substrates using other materials, good sinterability increases the value of the silver particle dispersion liquid.

As a result of further investigations in view of the above, it has been found that the above-described two requirements can be achieved when an amine compound having one or more unsaturated bond such as double bond in one molecule is used. It has been further found that in the reduction treatment, when the reaction temperature is increased stepwise, and a method of reducing at multistage reaction temperatures is employed, or operations of cleaning the obtained particle suspension and removal of coarse particles from the particle suspension are highly fabricated, the requirements can further advantageously be achieved in combination, and a silver particle dispersion liquid having good low temperature sinterability, having silver nanoparticles highly dispersed therein can be produced in high yield.

The items specified in the present invention are described below.

[Average Particle Diameter $D_{TEM}$]

The silver particle powder of the present invention has an average particle diameter (referred to as "$D_{TEM}$") measured by TEM (transmission electron microscope) observation of 200 nm or less, preferably 100 nm or less, more preferably 50 nm or less, further preferably 30 nm or less, and as the case may be, 20 nm or less. Due to this, the silver particle powder dispersion liquid of the present invention is suitable for the formation of fine interconnection. In the TEM observation, diameters of non-overlapped and independent 300 particles are measured from the image enlarged 600,000 times, and its average value is obtained.

[X-ray Crystal Particle Diameter Dx]

The silver particle powder of the present invention has a crystal particle (or called merely as "crystallite") diameter (referred to as "Dx") of 50 nm or less. X-ray crystal particle diameter of the silver particle powder can be determined using Scherrer equation from the X-ray diffraction result.

The determination method is as follows.

The Scherrer equation is expressed by the following general formula.

$$Dx = K \cdot \lambda / \beta \cos \theta$$

wherein K: Scherrer constant, Dx: crystal particle diameter, λ: measurement X-ray wavelength, β: half value width of peak obtained by X-ray diffraction, and θ: Bragg angle of diffraction line. When K employs the value of 0.94 and X-ray tube uses Cu, the above formula is rewritten as follows.

$$Dx = 0.94 \times 1.5405 / \beta \cos \theta$$

[Monocrystallinity]

The silver particle powder of the present invention has monocrystallinity ($D_{TEM}$/Dx) of 2.0 or less. Due to this, the silver particle powder can form fine interconnection, and has excellent migration resistance. Where the monocrystallinity is larger than 2.0, polycrystallinity is increased so that impurities tend to be included in the boundaries between crystallites, and pores tend to be generated at the time of calcination so that fine interconnection cannot be formed, which are not preferred. Furthermore, migration resistance is decreased due to impurities in the boundaries of the crystallites.

[Organic Protective Material]

In the present invention, silver particles whose surface is covered with an organic protective material are dispersed in a liquid organic liquid to form silver particle dispersion liquid. An amine compound having a molecular weight of 100 to 1,000, and preferably 100 to 400, and having one or more unsaturated bonds in one molecule is used as the organic protective material. It is estimated that by using the amine compound having an unsaturated bond as the organic protective material, silver nuclei are generated at once in the reduction reaction while the phenomenon occurs that the growth of the precipitated silver nuclei is homogeneously suppressed in total, and silver particle powder of 50 nm or less can be obtained in high yield as described before. Also, because the amine compound decomposes at relatively low temperature, low temperature sinterability of its silver particle dispersion liquid can be ensured. Representative amine compounds that can be used in the present invention include triallyl amine, oleyl amine, dioleyl amine and oleyl propylene diamine.

[Liquid Organic Medium]

A non-polar or small polar liquid organic medium having a boiling point of 60 to 300° C. is used as the liquid organic medium in which the silver particle powder covered with the organic protective material is dispersed. The term "non-polar or small polar" used herein means that dielectric constant at 25° C. is 15 or less, and more preferably 5 or less. Where the dielectric constant exceeds 15, dispersibility of the silver particles may deteriorate, causing precipitation thereof, which is not preferred. Various liquid organic media can be used according to applications of the dispersion liquid. Hydrocarbon-based compounds can preferably be used. In particular, aliphatic hydrocarbons such as isooctane, n-decane, isododecane, isohexane, n-undecane, n-tetradecane, n-dodecane, tridecane, hexane and heptane; and aromatic hydrocarbons such as benzene, toluene, xylene, ethylbenzene, decalin and tetralin can be used. These liquid organic media can be used alone or in combination of two or more thereof. A mixture such as kerosene may be used. Furthermore, to adjust polarity, alcohol-based, ketone-based, ether-based or ester-based polar organic media may be added in a range that the dielectric constant at 25° C. of the liquid organic medium after mixing is 15 or less.

[Alcohol or Polyol]

In the present invention, the silver compound is reduced in a liquid comprising one or more alcohol or polyol acting as a reducing agent. Examples of the alcohol that can be used include propyl alcohol, isopropyl alcohol, n-butanol, isobutanol, sec-butyl alcohol, tert-butyl alcohol, allyl alcohol, crotyl alcohol and cyclopentanol. Examples of the polyol that can be used include diethylene glycol, triethylene glycol and tetraethylene glycol.

[Viscosity]

The dispersion liquid comprising silver particle powder dispersed in a liquid organic medium according to the present invention is a Newtonian fluid, and its viscosity at a temperature of 25° C. is 50 mPa·s or less. Due to this, the silver particle dispersion liquid of the present invention is suitable as a material for interconnection formation by an inkjet method. In the case that interconnection formation is conducted by an inkjet method, uniformity in the amount of liquid droplets placed on a substrate is required in order to maintain flatness of interconnection. Because the silver particle dispersion liquid of the present invention is a Newtonian fluid, and has a viscosity of 50 mPa·s or less, nozzles do not clog, and liquid droplets can smoothly be discharged. Thus, the silver particle dispersion of the present invention can satisfy the requirement. The viscosity can be measured at a constant temperature of 25° C. by fitting a cone rotor 0.8° on R550 type Viscometer RE550L, a product of Toki Sangyo Co., Ltd.

[Surface Tension]

The silver particle dispersion liquid of the present invention has surface tension at 25° C. of 80 mN/m or less. Due to this, the silver particle dispersion liquid is suitable as a material for interconnection formation by an inkjet method. In using a dispersion liquid having large surface tension, the shape of meniscus at the nozzle tip is not stabilized so that it is difficult to control discharge amount and discharge timing, and wettability of liquid droplets placed on a substrate is poor, which result in deterioration of flatness of interconnection. On the other hand, the silver particle dispersion liquid of the present invention has surface tension of 80 mN/m or less, and as a result, such problems do not arise, and good quality interconnection can be formed. The surface tension can be measured at a constant temperature of 25° C. using CBVP-Z, a product of Kyowa Interface Science Co., Ltd.

[Passage Diameter of Membrane Filter]

The silver particle dispersion liquid of the present invention passes through a membrane filter having a pore diameter of (average particle diameter ($D_{TEM}$) of silver particle powder+20 nm). Because the silver particle dispersion liquid passes through a pore diameter larger than the average particle diameter $D_{TEM}$ of the silver particles only by 20 nm, it is understood that the silver particles in the dispersion liquid are in a state that individual particles can move in the liquid without aggregation, that is, the silver particles are substantially completely monodispersed. This fact shows that the silver particle dispersion liquid of the present invention is extremely suitable as a material for interconnection formation by an inkjet method. Where some particles form an aggregate, clogging of nozzles is liable to occur. Additionally, filling property of interconnection formed deteriorates, and pores are generated at the time of calcination, resulting in high resistance and disconnection. The dispersion liquid of the present invention can avoid these problems. In the membrane filter passing test, Anotop Plus 25 syringe filter (pore diameter of 20 nm), a product of Whatman, Inc, can be used as a filter having the smallest pore diameter.

[pH]

The silver particle dispersion liquid of the present invention has pH (hydrogen ion concentration) of 6.5 or more. Due to this, when used as a material for interconnection formation the silver particle dispersion liquid has the characteristics that it does not corrode a copper foil on a circuit board, and migration between interconnections hardly occurs. The pH of the dispersion liquid can be measured using pH Meter D-55T, and pH Electrode 6377-10D for low conductive water and non-aqueous solvent products of HORIBA, Ltd. Where the pH of a dispersion liquid measured by this method is less than 6.5, corrosion of a copper foil on a circuit board is generated by an acid component, and furthermore, migration is liable to occur between interconnections, lowering the reliability of a circuit.

[Ignition Loss]

Ignition loss (%) of the silver particle dispersion liquid is a value shown by the following formula.

$$\text{Ignition loss (\%)} = 100 \times [(W_{50} - W_{300})W_{50} - (W_{50} - W_{1000})/W_{50}]$$

wherein $W_{50}$, $W_{300}$ and $W_{1000}$ represent weights of the dispersion liquid at temperatures of 50° C., 300° C. and 1,000° C., respectively.

The ignition loss of the silver particle dispersion liquid of the present invention is less than 5%. Because the ignition loss is less than 5%, the organic protective material burns in a short period of time when calcining the interconnection, does not suppress sintering, and the interconnection having good conductivity is obtained. Where the ignition loss is 5% or more, the organic protective material acts as a sintering inhibitor at the time of calcination, resulting in increase of resistance of the interconnection, and as the case may be, impairing conductivity, which is not preferred.

The ignition loss can be measured by TG-DTA 2000 measuring device, a product of MAC Science/Bruker AX, under the following measurement conditions.

Sample weight: 20±1 mg
Temperature rising rate: 10° C./min
Atmosphere: Air (no aeration)
Standard sample: Alumina 20.0 mg
Measuring pan: Alumina measuring pan, a product of Rigaku Co., Ltd.
Temperature range: 50° C. to 1,000° C.

A process for producing a silver particle powder of the present invention is described below.

The silver particle powder of the present invention can be produced by subjecting a silver compound (various silver salts or silver oxides) to reduction treatment in an alcohol or a polyol at a temperature of 85 to 150° C. in the presence of an organic compound. As described before, the organic compound used is an amine compound having a molecular weight of 100 to 1,000 and having one or more unsaturated bonds in one molecule. This organic compound constitutes the organic protective material of the silver particle powder later.

The alcohol or the polyol functions as a reducing agent of the silver compound and as a liquid organic medium of the reaction system. The alcohol is preferably isobutanol, n-butanol, or the like. The reduction reaction is conducted under the reflux condition of repeating evaporation and condensation of the liquid organic medium/reducing agent under heating. The silver compound subjected to reduction includes silver chloride, silver nitride, silver oxide and silver carbonate. Silver nitride is preferred from the industrial standpoint, but the silver compound is not limited to silver nitride. In the process of the present invention, Ag ion concentration in the liquid at the time of the reaction is 50 mmol/liter or more. In conducting the reduction treatment, a process of conducting reduction treatment at multistage reaction temperature by increasing the reaction temperature stepwise is advantageous.

A suspension (slurry immediately after reaction) of the silver particle powder after the reaction can be formed into the silver particle dispersion liquid according to the present invention through the steps of cleaning, dispersion and classification. The representative examples of these steps are described below.

[Cleaning Step]

(1) A given amount of slurry after the reaction is subjected to solid-liquid separation at 3,000 rpm for 30 minutes using a centrifugal separator (CF7D2, a product of Hitachi Koki Co., Ltd.), and a supernatant is discarded.
(2) Methanol of the same amount as that of the slurry is added to the resulting precipitate, and the precipitate is dispersed with an ultrasonic disperser.
(3) (1) and (2) above are repeated two times.
(4) (1) above is conducted, and the supernatant is discarded to obtain the precipitate.

[Dispersion Step]

(1) A liquid organic medium is added to the precipitate after the cleaning step.
(2) The resulting mixture is treated with an ultrasonic disperser to prepare a silver particle turbid liquid.

[Classification Step]

(1) The turbid liquid of silver particles and the liquid organic medium after the dispersion step is subjected to solid-liquid separation at 3,000 rpm for 30 minutes using the same centrifugal separator.
(2) A supernatant is recovered. This supernatant is silver particle dispersion liquid.

[Silver Concentration in the Silver Particle Dispersion Liquid]

The silver concentration in the silver particle dispersion liquid can be calculated as follows.

(1) The silver particle dispersion liquid obtained in the classification step is transferred to a vessel having the known weight.
(2) The vessel is set to a vacuum drier, and the degree of vacuum and temperature are increased while taking great care so as not to generate bumping, thereby conducting condensation and drying. After the liquid has not been observed, drying is conducted at 200° C. for 6 hours in a vacuum state.
(3) After cooling to room temperature, the vessel is taken out of the vacuum drier, and its weight is measured.
(4) The weight of the vessel is subtracted from the weight of (3) above to obtain the weight of the silver particles in the silver particle dispersion liquid.
(5) The silver particle concentration in the silver dispersion liquid is calculated from the weight of (4) above and the weight of the silver particle dispersion liquid.

EXAMPLES

Example 1

185.83 ml of oleyl amine having one unsaturated bond in the molecule (Mw=267, a product of Wako Pure Chemical Industries, Ltd.) as a compound becoming an organic protective material, and 19.212 g of silver nitrate crystal (a product of Kanto Chemical Co., Inc.) as a silver compound were added to 140 ml of isobutanol (special grade, a product of Wako Pure Chemical Industries, Ltd.) as a liquid organic medium/reducing agent, followed by stirring with a magnet stirrer to dissolve the silver nitrate.

The solution was transferred to a vessel equipped with a reflux apparatus, and the vessel was placed on an oil bath. While blowing nitrogen gas as an inert gas into the vessel at a flow rate of 400 ml/min, the solution was heated while stirred at a rotation speed of 100 rpm by a magnet stirrer to conduct reflux at a temperature of 100° C. for 2 hours and 30 minutes. The temperature was then elevated to 108° C., reflux was conducted for 2 hours and 30 minutes, and the reaction was completed. In this case, the temperature rising rate to reach 100° C. and 108° C. each was 2° C./min.

40 ml of slurry after completion of the reaction was sampled, and the cleaning step, the dispersion step and the classification step described herein were conducted to obtain silver particle dispersion liquid. In this case, in the dispersion step, 40 ml of kerosene as a liquid organic solvent was added to prepare a turbid liquid. Regarding the silver particle dispersion liquid obtained through the classification step, various properties were evaluated by the methods described herein.

As a result, the silver particle obtained had an average particle diameter $D_{TEM}$ of 12.3 nm, a crystal particle diameter Dx of 15.0 nm, and monocrystallinity ($D_{TEM}$/Dx) of 0.82. The silver particle dispersion liquid had a silver particle concentration of 5 wt %, a viscosity of 1.1 mPa·s, surface tension of 25.4 mN/m, pH of 8.86 and ignition loss of 3.1%. The silver particle dispersion liquid passed through Anotop Plus 25 syringe filter (pore diameter of 20 nm), a product of Whatman, without problems, dispersibility was good, and aggregation was not observed.

Example 2

199.11 ml of oleyl amine having one unsaturated bond in the molecule (Mw=267, a product of Wako Pure Chemical Industries, Ltd.) as a compound becoming an organic protective material, and 20.59 g of silver nitrate crystal (a product of Kanto Chemical Co., Inc.) as a silver compound were added to 120 ml of isobutanol (special grade, a product of Wako Pure Chemical Industries, Ltd.) as a liquid organic medium/reducing agent, followed by stirring with a magnet stirrer to dissolve the silver nitrate.

The solution was transferred to a vessel equipped with a reflux apparatus, and the vessel was placed on an oil bath. While blowing nitrogen gas as an inert gas into the vessel at a flow rate of 400 ml/min, the solution was heated while stirred at a rotation speed of 100 rpm by a magnet stirrer to conduct reflux at a temperature of 108° C. for 5 hours, and the reaction was completed. In this case, the temperature rising rate to reach 108° C. was 2° C./min.

The whole amount of slurry after completion of the reaction was subjected to the cleaning step, the dispersion step and the classification step described herein to obtain silver particle dispersion liquid. In this case, in the dispersion step, 6.28 g of dodecane as a liquid organic solvent was added to prepare a turbid liquid. Regarding the silver particle dispersion liquid obtained through the classification step, various properties were evaluated by the methods described herein.

As a result, the silver particle obtained had an average particle diameter $D_{TEM}$ of 8.01 nm, a crystal particle diameter Dx of 4.69 nm, and monocrystallinity ($D_{TEM}$/Dx) of 1.71. The silver particle dispersion liquid had a silver particle concentration of 65.4 wt %, a viscosity of 10 mPa·s, surface tension of 25.0 mN/m, pH of 8.61 and ignition loss of 4.8%. The silver particle dispersion liquid passed through Anotop Plus 25 syringe filter (pore diameter 20 nm), a product of Whatman, without problems, dispersibility was good, and aggregation was not observed.

Example 3

199.11 ml of oleyl amine having one unsaturated bond in the molecule (Mw=267, a product of Wako Pure Chemical Industries, Ltd.) as a compound becoming an organic protective material, and 20.59 g of silver nitrate crystal (a product of Kanto Chemical Co., Inc.) as a silver compound were added to 120 ml of isobutanol (special grade, a product of Wako Pure Chemical Industries, Ltd.) as a liquid organic medium/reducing agent, followed by stirring with a magnet stirrer to dissolve silver nitrate.

The solution was transferred to a vessel equipped with a reflux apparatus, and the vessel was placed on an oil bath. While blowing nitrogen gas as an inert gas into the vessel at a flow rate of 400 ml/min, the solution was heated while stirred at a rotation speed of 100 rpm by a magnet stirrer to conduct reflux at a temperature of 108° C. for 5 hours, and the reaction was completed. In this case, the temperature rising rate to reach 108° C. was 2° C./min.

The whole amount of slurry after completion of the reaction was subjected to the washing step, the dispersion step and the classification step described herein to obtain silver particle dispersion. In this case, in the dispersion step, 2.43 g of tetradecane as a liquid organic solvent was added to prepare a turbid liquid. Regarding the silver particle dispersion liquid obtained through the classification step, various properties were evaluated by the methods described herein.

As a result, the silver particle obtained had an average particle diameter $D_{TEM}$ of 9.05 nm, a crystal particle diameter Dx of 6.02 nm, and monocrystallinity ($D_{TEM}$/Dx) of 1.50. The silver particle dispersion liquid had a silver particle concentration of 75.8 wt %, a viscosity of 18.3 mPa·s, surface tension of 23.5 mN/m, pH of 8.50 and ignition loss of 4.0%. The silver particle dispersion liquid passed through Anotop Plus 25 syringe filter (pore diameter of 20 nm), a product of Whatman, without problems, dispersibility was good, and aggregation was not observed.

Comparative Examples 1 and 2

Experiments were attempted under the same conditions as in Example 1, except for using cyclohexyl amine (Comparative Example 1) and ethylhexyl amine (Comparative Example 2), as the organic compound that does not have an unsaturated bond, in place of oleyl amine in Example 1. As a result, formation of particles was handly observed, and properties of particles could not even be confirmed. For confirmation, an ink was tried to prepare by the prescribed method using tetradecane as a dispersion medium. However, no particles dispersed in the ink could be observed.

The invention claimed is:

1. A silver particle dispersion ink for interconnection formation by inkjet method comprising a silver particle powder having an average particle diameter ($D_{TEM}$) of 50 nm or less, the surface of the particle being covered with an organic protective material of an amine compound having one or more unsaturated bond in one molecule, dispersed in a nonpolar or small polar liquid organic medium having a boiling point of 60 to 300° C., wherein the silver particle dispersion ink is a Newtonian liquid having a viscosity of 50 mPa·s or less, passes through a membrane filter having a pore diameter of (an average particle diameter of silver particle powder +20 nm), and has a silver concentration of 5 to 90 wt %, a surface tension of 80 mN/m or less, a pH of 6.5 or more, and an ignition loss of less than 5%.

2. The ink of claim 1, wherein the ink has a silver concentration of 5 to 75.8% and a viscosity of 1.1 to 18.3 mP·s.

3. The ink of claim 2, wherein the ink has an ignition loss of 3.1 to 4.8%.

4. The ink of claim 2, wherein the ink has a surface tension of 23.5 to 25.4 mN/m.

5. The ink of claim 1, wherein the ink has a silver concentration of 5 to 75.8% and a pH of 6.5 to 8.86.

* * * * *